US008499551B2

(12) United States Patent
Ishii

(10) Patent No.: US 8,499,551 B2
(45) Date of Patent: Aug. 6, 2013

(54) EXHAUST HEAT RECOVERING METHOD, EXHAUST HEAT RECOVERING APPARATUS AND COGENERATION SYSTEM

(75) Inventor: Naoki Ishii, Fuji (JP)

(73) Assignee: Purpose Company Limited, Fuji-shi, Shizuoka-ken (JP)

( * ) Notice: Subject to any disclaimer, the term of this patent is extended or adjusted under 35 U.S.C. 154(b) by 645 days.

(21) Appl. No.: 12/578,238

(22) Filed: Oct. 13, 2009

(65) Prior Publication Data
US 2010/0205958 A1   Aug. 19, 2010

(30) Foreign Application Priority Data

Feb. 19, 2009   (JP) ................. 2009-036615

(51) Int. Cl.
| F01N 3/02 | (2006.01) |
| F01N 5/02 | (2006.01) |
| F02G 3/00 | (2006.01) |
| F28D 15/00 | (2006.01) |
| F28F 13/06 | (2006.01) |
| G05D 23/00 | (2006.01) |

(52) U.S. Cl.
USPC .......... 60/320; 60/616; 165/104.11; 165/108; 165/300

(58) Field of Classification Search
USPC .......... 60/320, 321, 616; 165/104.11, 104.13, 165/104.14, 108, 300; 290/2
See application file for complete search history.

(56) References Cited

U.S. PATENT DOCUMENTS

| 6,324,849 B1 | 12/2001 | Togawa et al. | |
| 2005/0164056 A1* | 7/2005 | Tanaka et al. | 429/24 |
| 2006/0144585 A1* | 7/2006 | Ha et al. | 165/901 |
| 2006/0242977 A1* | 11/2006 | Cho et al. | 62/238.7 |
| 2008/0141664 A1* | 6/2008 | Bidner et al. | 60/320 |
| 2009/0020281 A1* | 1/2009 | Ueda et al. | 165/287 |
| 2009/0108588 A1* | 4/2009 | Yuri et al. | 290/1 A |

FOREIGN PATENT DOCUMENTS

| JP | 58-189494 U | 12/1983 |
| JP | 60-224959 A | 11/1985 |
| JP | 1-106962 A | 4/1989 |
| JP | 01-110866 A | 4/1989 |
| JP | 08-86242 A | 4/1996 |
| JP | 10-141137 A | 5/1998 |
| JP | 2001-123885 A | 5/2001 |
| JP | 2006-336607 A | 12/2006 |
| JP | 2007064518 A * | 3/2007 |
| JP | 2008-121572 A | 5/2008 |
| WO | WO 2006095555 A1 * | 9/2006 |

OTHER PUBLICATIONS

Japanese Office Action dated Sep. 4, 2012, issued in corresponding Japanese Patent Application No. 2009-036615, (12 pages). With partial English Translation.

* cited by examiner

*Primary Examiner* — Kenneth Bomberg
*Assistant Examiner* — Audrey K Bradley
(74) *Attorney, Agent, or Firm* — Westerman, Hattori, Daniels & Adrian, LLP

(57) ABSTRACT

A first heat medium is circulated in a first circulating path (engine cooling circuit) of a heat source (engine) to cool the heat source down by the first heat medium, and exhaust heat from the heat source is absorbed by the first heat medium. A second heat medium is circulated in a second circulating path (exhaust heat recovering circuit) to exchange heat of exhaust air with the second heat medium, and heat of the first heat medium is exchanged with the second heat medium circulating in the second circulation path. The heat of the second medium to which heat is applied due to these heat exchanges is stored in heat storage means (heat storage tank).

9 Claims, 13 Drawing Sheets

EXHAUST HEAT RECOVERING METHOD, EXHAUST HEAT RECOVERING APPARATUS AND COGENERATION SYSTEM

CROSS-REFERENCE TO RELATED APPLICATION

This application is based upon and claims the benefit of priority from the prior Japanese Patent Application No. 2009-36615, filed on Feb. 19, 2009, the entire contents of which are incorporated herein by reference.

BACKGROUND OF THE INVENTION

1. Field of the Invention

The present invention relates to a heat recovering technique for recovering exhaust heat, and relates to an exhaust heat recovering method, an exhaust heat recovering apparatus and a cogeneration system that recover exhaust heat from a heat source generating exhaust air, for example, an engine and from the exhaust air to store the heat in a heat medium such as hot water.

2. Description of the Related Art

Conventionally, a dynamo which uses an engine fueled by fuel gas as a power source is known. The engine driving the dynamo generates heat according to combustion of fuel. An exhaust heat recovering apparatus recovering and using exhaust heat from the generated heat is in practical use.

Concerning such exhaust heat recovering, it is known that heat of exhaust air from an engine, and condensation heat thereof are recovered (for example, Japanese Laid-open Patent Publication No. 2001-123885).

Recovering the condensation heat from exhaust air (Japanese Laid-open Patent Publication No. 2001-123885) is recovering latent heat in exhaust gas. In this exhaust heat recovering apparatus, a heat medium sent out by a pump exchanges heat with engine oil, exchanges heat with exhaust air in a heat exchanger, then further exchanges heat with an engine along with cooling down the engine to store the recovered heat in a heat storage tank. In this case, the temperature of the heat medium is set low so that the temperature of the water vapor in the exhaust air from which heat is exchanged stays lower than the dew point to recover condensation heat (latent heat) in the exhaust air to the heat medium.

Even if the temperature of the heat medium introduced into the heat exchanger is controlled low, some degrees of a temperature is required by an introduced temperature to an engine cooling unit in order to protect the engine. Therefore, it is necessary for raising the temperature of the heat medium in the heat exchanger to restrict the flow rate of the heat medium. If the flow rate of the heat medium is restricted, the temperature in heat exchange with the engine oil rises more substantially. Thus, it becomes difficult to introduce the heat medium to the heat exchanger at an expected temperature.

In power generation using an engine, when surplus power is generated, the electricity is converted to heat by a heater, etc. to be recovered. There is inconvenience, if the heater is disposed in a heat medium circuit, that the heat medium is boiled in a heating unit by heater heat generation when the flow rate of the heat medium is low.

Concerning such problems, there is no disclosure nor suggestion thereof in Japanese Laid-open Patent Publication No. 2001-123885, and no disclosure nor suggestion about structure, etc. solving them are presented therein.

SUMMARY OF THE INVENTION

An object of the present invention is to recover exhaust heat from a heat source such as an engine generating exhaust air efficiently.

Another object of the present invention is to recover heat obtained by surplus power from a heat generation source without inconvenience such as a boil of a heat medium in addition to the above object.

To achieve the above objects, the present invention is an exhaust heat recovering method recovering heat from a heat source generating exhaust air, and the exhaust air, an exhaust heat recovering apparatus therefor or a cogeneration system including the exhaust heat recovering apparatus. In the exhaust heat recovering method, exhaust heat recovering apparatus or cogeneration system, a first heat medium is circulated in a first circulating path of a heat source to cool the heat source down by the first heat medium, and exhaust heat from the heat source is absorbed by the first heat medium. A second heat medium is circulated in a second circulating path to exchange heat of exhaust air with the second heat medium, and heat of the first heat medium is exchanged with the second heat medium circulating in the second circulation path. The heat of the second medium to which heat is applied due to these heat exchanges is stored in heat storage means. The heat source may be an engine, and may be a heat generation source other than the engine, if the source accompanies exhaust air.

To achieve the above objects, an exhaust heat recovering method of the present invention is the exhaust heat recovering method recovering heat from a heat source generating exhaust air, and from the exhaust air, the method comprising: cooling a heat source down by a first heat medium, by circulating the first heat medium in the heat source; circulating a second heat medium in a second circulating path; exchanging firstly heat of the exhaust air with the second heat medium circulating in the second circulating path; exchanging secondly heat of the first heat medium with the second heat medium circulating in the second circulating path; and storing heat of the second heat medium to which heat is applied by the first and/or the second heat exchanging.

To achieve the above objects, an exhaust heat recovering apparatus of the present invention is the exhaust heat recovering apparatus recovering heat from a heat source generating exhaust air, and from the exhaust air, the apparatus comprising: a first circulating path cooling a heat source down by a first heat medium, by circulating the first heat medium in the heat source; a second circulating path circulating a second heat medium; a first heat exchange means exchanging heat of the exhaust air with the second heat medium circulating in the second circulating path; a second heat exchange means exchanging heat of the first heat medium with the second heat medium circulating in the second circulating path; and a heat storage means storing heat of the second heat medium to which heat is applied by the first and/or the second heat exchange means.

To achieve the above objects, a cogeneration system of the present invention is the cogeneration system including an exhaust heat recovering apparatus recovering heat from a heat source generating exhaust air, and from the exhaust air, the system comprising: a first circulating path cooling a heat source down by a first heat medium, by circulating the first heat medium in the heat source; a second circulating path circulating a second heat medium; a first heat exchange means exchanging heat of the exhaust air with the second heat medium circulating in the second circulating path; a second heat exchange means exchanging heat of the first heat medium with the second heat medium circulating in the second circulating path; and a heat storage means storing heat of the second heat medium to which heat is applied by the first and/or the second heat exchange means.

In the exhaust heat recovering method, an exhaust heat recovering apparatus or the cogeneration system, heat exchanged with the first heat medium by cooling the heat source down is exchanged from the first heat medium to the second heat medium. With this second heat medium, heat of exhaust air from the heat source is exchanged. Thus, both exhaust heat of the heat source and heat from the exhaust air are exchanged with the second heat medium to be stored. In this method, since heat is recovered by cooling the heat source down and from the exhaust air, even latent heat of the exhaust air can be recovered to enable improvement of efficiency of recovering exhaust heat.

In the exhaust heat recovering apparatus of the present invention, the second heat medium may be liquid, the heat storage means may include a tank that stores the second heat medium, and heat may be applied to the second heat medium taken out from a lower layer of the tank by the first heat exchange means and the second heat exchange means to return the second heat medium to an upper layer of the tank. According to such structure, heat exchange is performed for the heat medium of low temperature and the heat medium after the heat exchange is returned to the upper layer of the tank. Thus, layer collapse by a convection operation of liquid is prevented, and heat storage by the heat medium of high temperature can be performed, the heat storage can be performed efficiently, and the heat storage of high quality can be performed.

The exhaust heat recovering apparatus of the present invention may comprise a temperature detection means detecting a temperature of the second heat medium; a bypass bypassing the tank to make the second heat medium flow in the second circulation path; and a flow path switch means switching a flow path in which the second heat medium flow to the bypass side and/or the tank side, wherein if a detected temperature of the temperature detection means is equal to or over a reference temperature, the second heat medium may be returned to the tank, and if the detected temperature thereof is under the reference temperature, the second heat medium may be circulated in the bypass side. According to such structure, the heat medium under the reference temperature circulates in the heat exchange means side for heat exchange. Thus, the temperature of the heat medium returned into the tank can be maintained at the reference temperature or thereover, the above described layer collapse in the tank can be prevented, heat storage by the heat medium of high temperature can be performed, the heat storage can be performed efficiently, and the heat storage of high quality can be performed.

The exhaust heat recovering apparatus of the present invention may comprise: a temperature detection means detecting a temperature of the first heat medium; a pump disposed in the second circulation path; and a control means driving the pump according to a detected temperature by the temperature detection means to circulate the second heat medium in the second circulation path, and controlling a circulation rate of the second heat medium to a circulation rate making the detected temperature a predetermined temperature. In this case, the predetermined temperature may be set arbitrarily according to the volume of coolant in the heat source side.

According to such structure, the amount of heat absorbed from the heat source side to the first heat medium can be monitored by the detected temperature of the temperature detection means. If this detected temperature is set arbitrarily according to the volume of the coolant at the heat source side, the pump is driven to circulate the heat medium in the second circulating path according to the detected temperature of the temperature detection means, and a circulation rate thereof can be controlled to the circulation rate so that the detected temperature becomes the predetermined temperature. Thus, exhaust heat recovering can be performed with evaluating efficiency for the heat source side without cooling the heat source down extremely.

The exhaust heat recovering apparatus of the present invention may comprise: a dynamo driven by the heat source; and a heat application means converting electricity generated by the dynamo to heat, and applying heat to the first heat medium and/or the second heat medium by the converted heat. According to such structure, an output of the dynamo driven by the heat source, for example, an engine, that is, electric power is converted to heat by the heating means, and used for heating either or both of the first heat medium and the second heat medium. For example, surplus power is converted to heat to be supplied for heat storage. As a result, efficient heat storage can be performed.

In the above exhaust heat recovering apparatus, an engine may be used for the heat source.

In the cogeneration system of the present invention, the second heat medium may be liquid, the heat storage means may include a tank that stores the second heat medium, and heat may be applied to the second heat medium taken out from a lower layer of the tank by the first heat exchange means and the second heat exchange means to return the second heat medium to an upper layer of the tank.

The cogeneration system of the present invention may comprise a temperature detection means detecting a temperature of the second heat medium; a bypass bypassing the tank to make the second heat medium flow in the second circulation path; and a flow path switch means switching a flow path in which the second heat medium flow to the bypass side and/or the tank side, wherein if a detected temperature of the temperature detection means is equal to or over a reference temperature, the second heat medium may be returned to the tank, and if the detected temperature thereof is under the reference temperature, the second heat medium may be circulated in the bypass side.

The cogeneration system of the present invention may comprise a temperature detection means detecting a temperature of the first heat medium; a pump disposed in the second circulation path; and a control means driving the pump according to a detected temperature by the temperature detection means to circulate the second heat medium in the second circulation path, and controlling a circulation rate of the second heat medium to a circulation rate making the detected temperature a predetermined temperature.

The cogeneration system of the present invention may comprise a dynamo driven by the heat source; and a heat application means converting electricity generated by the dynamo to heat, and applying heat to the first heat medium and/or the second heat medium by the converted heat.

The features and advantages of the above described exhaust heat recovering method, apparatus therefor or cogeneration system of the present invention are listed as follows.

(1) Exhaust heat can be efficiently recovered from a heat source generating exhaust air and from the exhaust air, and the recovered heat can be stored with a heat medium.

(2) A heat medium for recovering exhaust heat can be supplied at low temperature. Thus, even latent heat in exhaust air can be recovered, and efficient exhaust heat recovering can be realized.

Other objects, features and advantages of the present invention are more clearly understood by referring to the attached drawings and each of embodiments.

DETAILED DESCRIPTION OF THE PREFERRED EMBODIMENTS

First Embodiment

Figure 1:
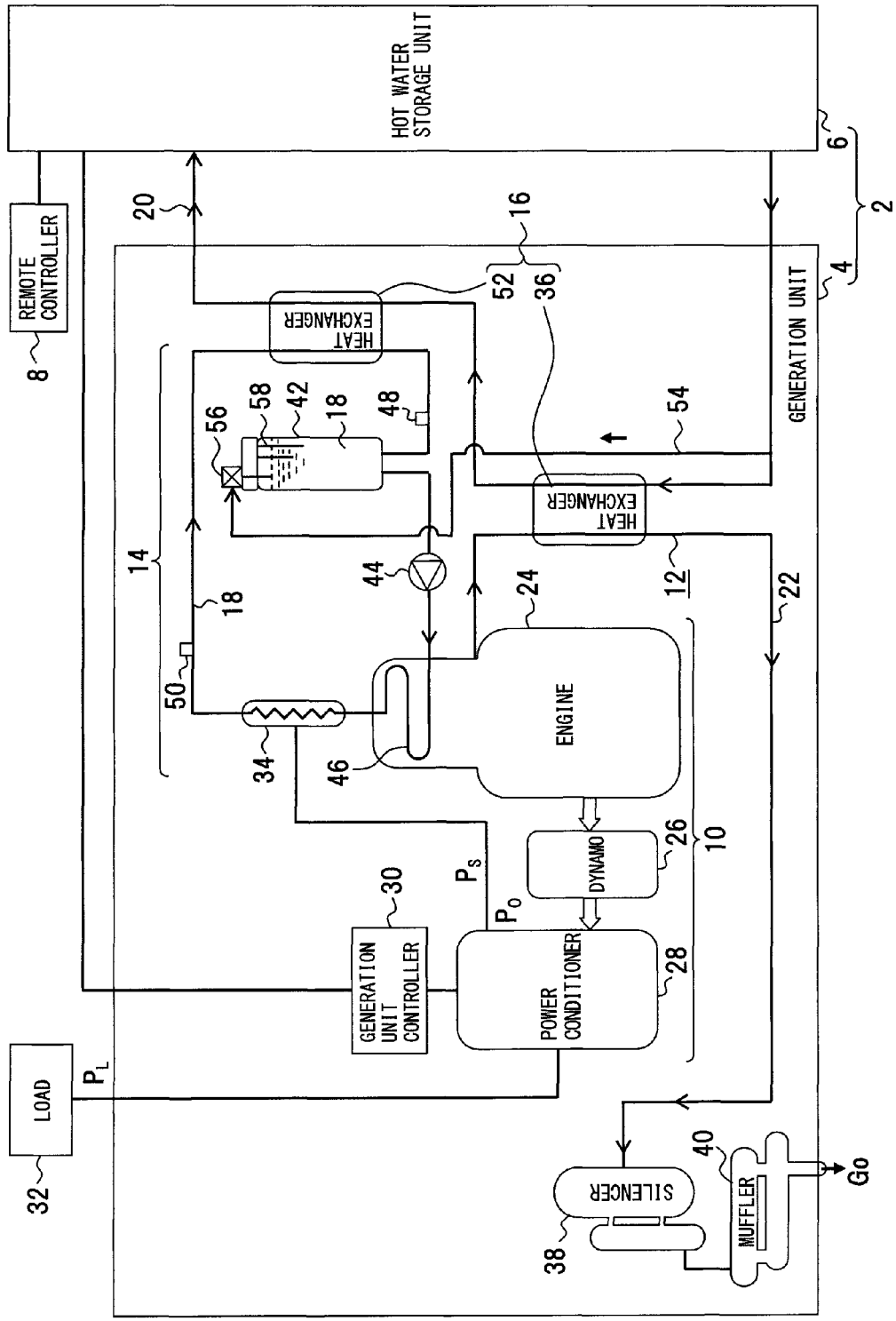
FIG. 1 depicts one example of a cogeneration system according to a first embodiment.
Figure 2:
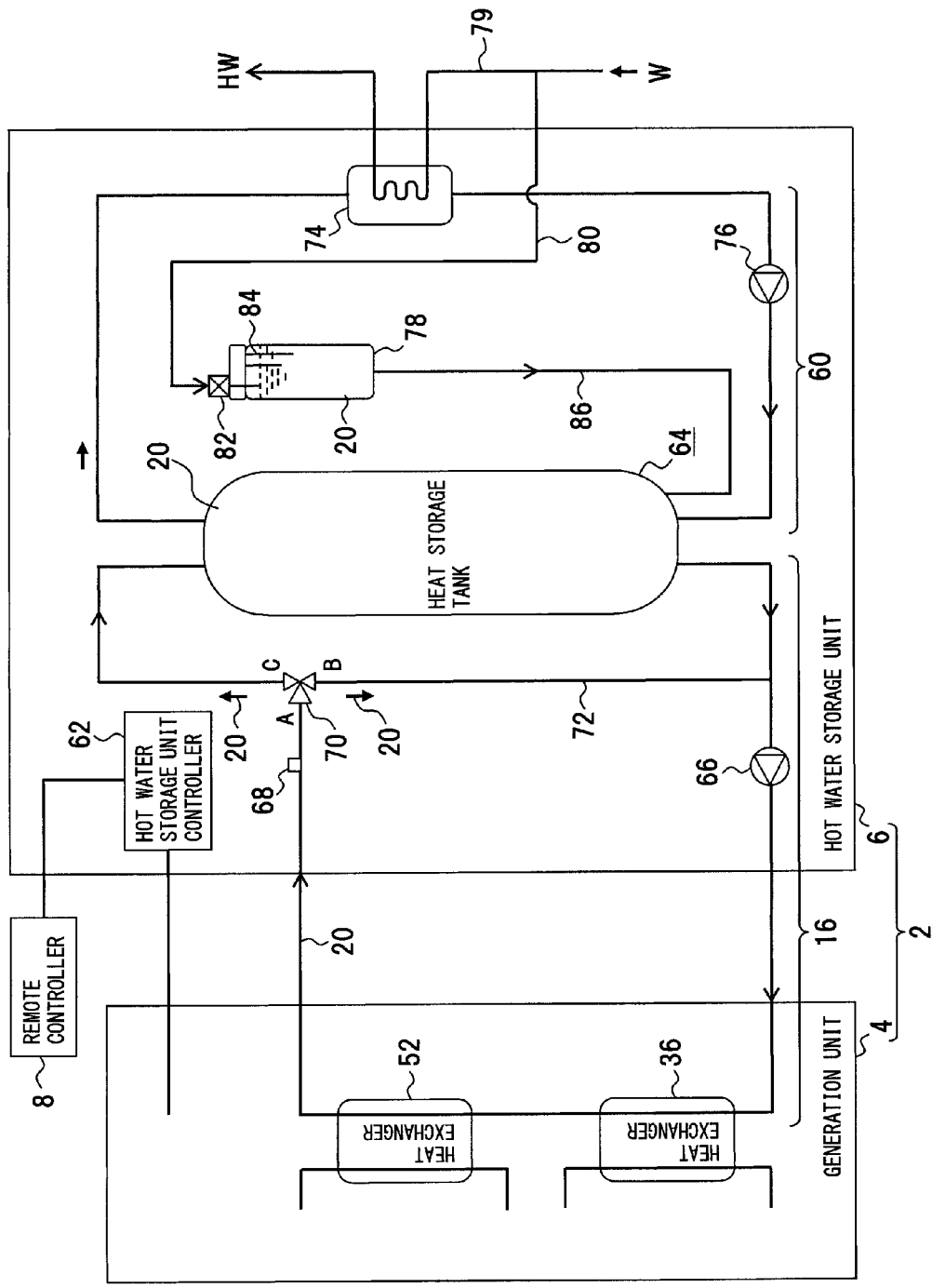
FIG. 2 depicts one example of the cogeneration system.

This first embodiment is described with reference to FIGS. 1 and 2. FIG. 1 depicts a generation unit of a cogeneration system according to the first embodiment, and FIG. 2 depicts a hot water storage unit. Structure shown in FIGS. 1 and 2 is one example, and the present invention is not limited to such structure.

This cogeneration system 2 is one example of an exhaust heat recovering method or exhaust heat recovering apparatus, and includes a generation unit 4 and a hot water storage unit 6. The generation unit 4 includes a generation function unit 10, an exhaust gas circuit 12, an engine cooling circuit 14 and an exhaust heat recovering circuit 16. The engine cooling circuit 14 is one example of a first circulation path for circulating a first heat medium 18, and the exhaust heat recovering circuit 16 is one example of a second circulation path for circulating a second heat medium 20. The heat medium 18 is coolant of a heat source. The heat medium 20 is a heat storage medium. In this cogeneration system 2, a heat source (an engine 24) is cooled down by the heat medium 18, that is, heat of the heat source is exchanged by the heat medium 18, both heat of this heat medium 18 and that of exhaust air 22 are recovered to the heat medium 20 by the heat exchange, and the heat in this heat medium 20 is stored in heat storage means at the hot water storage unit 6 side.

The generation function unit 10 includes the engine 24, a dynamo 26, a power conditioner 28 and a generation unit controller 30. The engine 24 is driving means of the dynamo 26, and generates a rotational force by burning fuel such as town gas, LPG, gasoline, kerosene and gas oil. The engine 24 generates heat from combustion of the fuel to generate the exhaust air 22. Therefore, the engine 24 is a heat generating source and an exhaust heat source. The exhaust air 22 that the engine 24 generates is also a heat source.

The dynamo 26 is a generation means using the engine 24 as driving means, and generates electricity in response to the rotational force of the engine 24. This generation output may be an alternating current or a direct current.

The power conditioner 28 is composed of, for example, an inverter that is power converting means, and an output from the dynamo 26 is converted to a predetermined voltage, for example, a voltage output equal to that for a commercial alternating current (100V). This output from the power conditioner 28 is supplied to a load 32, and utilized for surplus power. The load 32 is, for example, consumption of household electricity. Surplus power $P_S$ is generated when power consumption $P_L$ as household electricity is low for generated power $P_O$ ($P_O > P_L$, $P_S = P_O - P_L$). This surplus power is supplied to a surplus power heater 34 in the engine cooling circuit 14 to be converted to heat.

The generation unit controller 30 is control means for the engine cooling circuit 14, etc, and electricity is supplied for the generation unit controller 30 by the output of the power conditioner 28. The generation unit controller 30 gives function units a control output for exhaust heat recovering in response to detection outputs from various types of sensors. This generation unit controller 30 is connected to a hot water storage unit controller 62 at the hot water storage unit 6 side (FIG. 2), and in this embodiment, is operated via the hot water storage unit controller 62 by a remote controller 8 connected to the hot water storage unit controller 62. The remoter controller 8 is one example of remote control means, and used for remote operations of the generation unit controller 30 and the hot water storage unit 6.

The exhaust gas circuit 12 is exhaust means through which the exhaust air (Go) 22 from the engine 24 passes, and includes a first heat exchanger 36, a silencer 38 and a muffler 40. The heat exchanger 36 is means for exchanging the heat from exhaust gas Go with the heat medium 20 at a heat storage side, and disposed between the exhaust gas circuit 12 and the exhaust heat recovering circuit 16. The silencer 38 and the muffler 40 are sound deadening means of an exhaust gas system, and decreases noise accompanying exhaust air.

The engine cooling circuit 14 is means for cooling down the engine 24 by the heat medium 18, and for recovering heat from the engine 24 (exhaust heat) by heat exchange to the heat medium 18. In this engine cooling circuit 14, a reserve tank 42, a pump 44, a heat exchanging unit 46, temperature sensors 48 and 50, a second heat exchanger 52 and a surplus power heater 34 are included. The surplus power heater 34 is one example of heat application means for converting electricity generated by the dynamo 26 to heat, and applying heat to either or both of the heat medium 18 and the heat medium 20 by the converted heat.

The reserve tank 42 is means for reserving the heat medium 18. To this reserve tank 42, a refill circuit 54 that is branched from the exhaust heat recovering circuit 16 is connected. A refill valve 56 and a level sensor 58 are disposed on this reserve tank 42. When the level sensor 58 detects a level necessary for refilling water, the refill valve 56 is opened, and the reserve tank 42 is refilled with the heat medium 18 from the exhaust heat recovering circuit 16.

The pump 44 is means for forcibly circulating the heat medium 18 in the engine cooling circuit 14. Thereby, the heat medium 18 circulates in the heat exchanging unit 46, the temperature sensors 48 and 50, the heat exchanger 52 and the surplus power heater 34.

The heat exchanging unit 46 is heat exchange means disposed in the engine 24, and exchanges the exhaust heat from the engine 24 to the heat medium 18. The temperature sensors 48 and 50 are temperature detection means for the heat medium 18, and composed of, for example, a thermistor temperature sensor. The temperature sensor 48 detects the temperature of the heat medium 18 at an inlet of the engine 24. The temperature sensor 50 detects the temperature of the heat medium 18 at an outlet of the heat exchanging unit 46. In this embodiment, the temperature sensor 50 is disposed at an outlet of the surplus power heater 34, and detects the temperature of the heat medium 18 to which heat is applied by the heat exchanging unit 46 and the surplus power heater 34.

The heat exchanger 52 is means for exchanging heat of the heat medium 18 with the heat medium 20 at a heat storage side, and disposed between the engine cooling circuit 14 and the exhaust heat recovering circuit 16.

In the hot water storage unit 6, as shown in FIG. 2, the above described exhaust heat recovering circuit 16, a hot water supply side heat exchange circuit 60 and the hot water storage unit controller 62 are included. In the exhaust heat recovering circuit 16, a heat storage tank 64, a pump 66, a temperature sensor 68, a three-way valve 70 and a bypass 72 are included. The heat storage tank 64 is one example of heat storage means, and stores the heat medium 20.

The pump 66 is means for forcibly circulating the heat medium 20 in the exhaust heat recovering circuit 16. The temperature sensor 68 is means for detecting the temperature of the heat medium 20 that flows through the heat storage tank or the bypass 72, and is composed of, for example, a thermistor temperature sensor.

The three-way valve 70 is a switching valve as means for switching heat medium flow paths of the bypass 72 set together with the heat storage tank 64 and the exhaust heat recovering circuit 16 at the heat storage tank 64 side. When the heat medium 20 is flew into the heat storage tank 64, a port A-C is opened, and when the heat medium 20 is bypassed against the heat storage tank 64, a port A-B is opened.

The hot water supply side heat exchange circuit 60 is means for exchanging the heat of the heat medium 20 with clean water W to obtain and supply hot water HW, and means for refilling the clean water W as the heat medium 20. In this hot water supply side heat exchange circuit 60, a third heat exchanger 74, a pump 76 and a reserve tank 78 are included.

The heat exchanger 74 is means for exchanging the heat of the heat medium 20 with the clean water W. The pump 76 is means for forcibly circulating the heat medium 20 into the heat exchanger 74. The hot water HW obtained from the heat exchanger 74 is supplied for household, etc.

The reserve tank 78 is means for reserving the heat medium 20 and releasing the heat medium 20 to the atmosphere. To this reserve tank 78, a refill path 80 branched from a clean water path 79 is connected, a refill valve 82 is disposed as means for opening and closing the refill path 80 and a level sensor 84 is disposed as means for detecting the level of the heat medium 20 in the reserve tank 78. If the detection level of the level sensor 84 is under a reference level, the refill valve 82 is opened, and the clean water W is refilled to the reserve tank 78. This reserve tank 78 is connected to the bottom side of the heat storage tank 64 via the refill path 86 to release the heat medium 20 in the heat storage tank 64 to the atmosphere via the refill path 86 and the reserve tank 78, and the heat medium 20 is refilled from the reserve tank 78 to the bottom side of the heat storage tank 64.

The hot water storage unit controller 62 is control means for the hot water storage unit 6, etc. The hot water storage unit controller 62 controls function units such that the pump 76 is driven and stopped, the refill valve 82 is opened and closed, etc. by using the detection temperature of the temperature sensor 68, the detection output of the level sensor 84 in the reserve tank 78 as control information.

To the hot water storage unit controller 62, the remote controller 8 is connected. The remote controller 8 is remote operation means for the hot water storage unit controller 62, and used for operations necessary for the above described control.

Concerning this cogeneration system 2, an exhaust heat recovering operation and a hot water supply operation are described.

If the engine 24 is driven, the engine 24 generates heat. Heat thereof is exchanged with the heat medium 18 circulating in the engine cooling circuit 14 to be absorbed into the heat medium 18. The case where the temperature of the heat medium 18 introduced into the engine 24 is low is not suitable for exhaust heat recovering since dew drops are generated inside the engine 24. Therefore, the detection temperature of the temperature sensor 48 is monitored. It is desirable to move to the exhaust heat recovering after the detection temperature achieves at the temperature at which the engine 24 can be efficiently driven, for example, 68 (° C.)-73 (° C.).

The heat medium 18 (coolant) is circulated in the engine cooling circuit 14. The amount of heat obtained by the heat medium 18 cooling the engine 24 down is approximately definite. Therefore, the pump 44 is controlled to the predetermined rotational number so as to obtain a predetermined flow rate, for example, 3.0 (L/min). This is a basic driving. The temperature at the inlet side of the engine 24 is detected by the temperature sensor 48, and the detection temperature is monitored. Temperature adjustment of the heat medium 18 is performed by increase and decrease of the flow rate of the heat medium 18. The temperature of the heat medium 18 is detected by the temperature sensor 50, and if the detection temperature is abnormally high, the engine 24 is stopped.

The temperature of the exhaust air from the engine 24 is high, for example, 300-400 (° C.). This exhaust air 22 is introduced into the heat exchanger 36. After heat of the exhaust air 22 is exchanged with the heat medium 20, the exhaust air 22 is exhausted to the outside air via the silencer 38 and the muffler 40. If the temperature of the heat medium 20, the heat of which is exchanged by the heat exchanger 36, is low, for example, about under 40 (° C.), condensation heat (latent heat) can be exchanged with the heat medium 20 to be recovered since water vapor in the exhaust air 22 is equal to or under the dew point temperature.

In the exhaust heat recovering circuit 16, the heat exchanger 36 that is gas-liquid heat exchange means for recovering the heat of the exhaust air 22 of the engine 24, and the heat exchanger 52 that is liquid-liquid heat exchange means for exchanging the heat of the heat medium 18 with the heat medium 20 to recover the heat are included.

The heat medium 20 to which heat is applied by the heat exchange with the exhaust air 22 at the heat exchanger 36 circulates in the heat exchanger 52, and performs heat exchange with the heat medium 18 flowing through the engine cooling circuit 14. In this time, the rotational number of the pump 44 is controlled so that the detection temperature of the heat medium 18 becomes the temperature suitable for the engine cooling, for example, 68 (° C.)-73 (° C.). In this control, if the detection temperature of the temperature sensor 48 is equal to or over (higher than) the reference temperature, the rotational number of the pump 44 is increased, and if the detection temperature thereof is under the reference temperature, the rotational number of the pump 44 is decreased, thus the circulation rate of the heat medium 18 is controlled to a predetermined circulation rate so that the detection temperature becomes the reference temperature. Therefore, excessive cooling down of the engine 24 is prevented, and efficiency at the engine 24 side is not down.

Since the heat medium 20 flows from the bottom of the heat storage tank 64 into the exchangers 36 and 52, the heat medium 20 of low temperature flows in the heat exchanger 36 irrelevantly to the rotational number of the pump 66. In the heat exchanger 36, the heat exchange with the exhaust air of the engine 24 is continuously performed, and the concentration heat can be recovered from the exhaust air 22.

The heat medium 20 passing through the heat exchanger 36 and the heat exchanger 52 is introduced to the heat storage tank 64 side by the pump 66. The temperature of this heat medium 20 is detected by the temperature sensor 68. Whether the detection temperature thereof is equal to or over the reference temperature, for example, 75 (° C.) or not is determined. If the detection temperature of the heat medium 20 is equal to or over the reference temperature, the port of the three-way valve 70 is switched to the port A-C side to return the heat medium 20 of high temperature to the upper layer of the heat storage tank 64. If the detection temperature is under the reference temperature, the port of the three-way valve 70 is switched to the port A-B side to flow the heat medium 20 of low temperature to the bypass 72. Thus, the heat medium 20 is circulated in the heat exchanger 36 and the heat exchanger 52, and it is prevented that the heat medium 20 of low temperature flows into the upper layer of the heat storage tank 64.

As a result, the heat medium 20 of high temperature is returned to the heat storage tank 64 to perform heat storage of high quality. The heat medium 20 of low temperature performs the exhaust heat recovering again. Such operation that the heat medium 20 is made to flow into the bypass 72 side occurs when power generation is started, etc.

As the exhaust heat recovering progresses, the area occupied by the heat medium 20 of high temperature, that is, a rate of being occupied by the heat medium 20 of high temperature increases in the heat storage tank 64. When the heat storage tank 64 is filled with heat medium 20 of high temperature, the exhaust heat recovering is no more needed. In this case, the engine 24 is stopped, and the power generation is ended. At this time, the pumps 44 and 66 are stopped to end the exhaust heat recovering.

The heat of the heat medium 20 is consumed by hot water supply. When a hot water supply stopper not shown is opened, a hot water supply request is generated and the pump 76 is driven. From the upper layer of the heat medium 20 in the heat storage tank 64, the heat medium 20 circulates in the hot water supply side heat exchange circuit 60 to be introduced to the heat exchanger 74. Since the clean water W is supplied in the heat exchanger 74, the hot water HW can be obtained by exchanging heat of the heat medium 20 with the clean water W to be supplied. The temperature of the supplied hot water is adjusted by the flow rate of the heat medium 20 introduced to the heat exchanger 74 according to the rotational number of the pump 76, etc. Since the temperature of the heat medium 20, the heat of which is exchanged with the clean water W, is made to be low, the exchanged heat medium 20 is returned to the lower layer of the heat medium 20 in the heat storage tank 64. Therefore, the temperature at the upper layer of the heat medium 20 is not disturbed.

Figure 3:
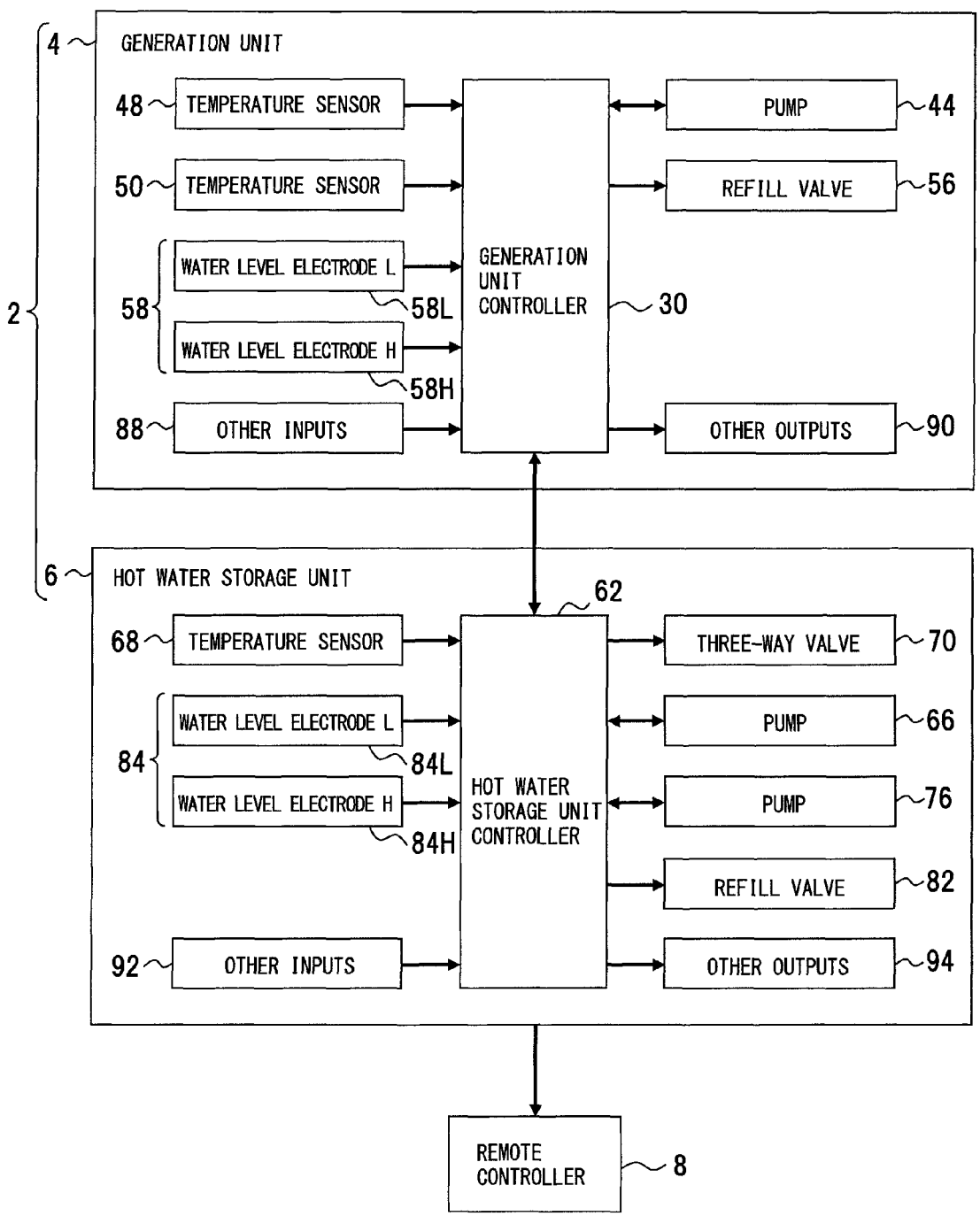
FIG. 3 depicts one example of control apparatuses.

Control apparatus for this cogeneration system 2 is described with reference to FIG. 3. FIG. 3 depicts control apparatuses. The structure shown in FIG. 3 is one example, and the present invention is not limited to such structure. In FIG. 3, the same components as those in FIGS. 1 and 2 are denoted by the same reference numerals.

In this system 2, the generation unit controller 30 is provided at the generation unit 4 side, and the hot water storage unit controller 62 is provided at the hot water storage unit 6, as control means for realizing the above described control operations. These controllers 30 and 62 are composed of, for example, a microcomputer, and include a timer as means for measuring time.

To the generation unit controller 30, the detected outputs of the temperature sensors 48 and 50 and the level sensor 58, and other inputs 88 are applied. Then the control outputs for the pump 44 and the refill valve 56, and other outputs 90 are taken out.

The level sensor 58 includes a water level electrode 58L that detects low (L) levels and a water level electrode 58H that detects high (H) levels. These detected outputs of the L level or H level are used as control information for controlling open and close of the refill valve 56.

The Other inputs 88 are information inputted from input devices such as a keyboard except other sensors. To this generation unit controller 30, the input such as power on from the remote controller 8 is also applied.

With using such detection information as control information, in the generation unit controller 30, driving the pump 44 and control of rotation thereof or stop thereof, etc. are performed, and also, open and close of the refill valve 56 and control of other function units, etc. are executed.

To the hot water storage unit controller 62, the detection outputs of the temperature sensor 68 and the level sensor 84, and other inputs 92 are applied. The control outputs for the three-way valve 70, pumps 66 and 76 and the refill valve 82, and other outputs 94 are taken out from the hot water storage unit controller 62.

The level sensor 84 provides a water level electrode 84L that detects low (L) levels and a water level electrode 84H that detects high (H) levels. These detection outputs of the L level or H level are used as control information for control open and close the refill valve 82.

The Other inputs 92 are information inputted from input devices such as a keyboard except other sensors. To this hot water storage unit controller 62, the input such as power on from the remote controller 8 is also applied.

With using such detection information as control information, in the hot water storage unit controller 62, driving the pump 66 or the pump 76 and control of rotation thereof or stop thereof, etc. are executed. Open and close of the refill valve 82, switch of the three-way valve 70, and control of other function units, etc. are also executed.

In this case, the generation unit controller 30 and the hot water storage unit controller 62 are connected via bidirectional communication, and can share data such as status of the control inputs and control outputs of various sensors. By the remote controller 8 connected to the hot water storage unit controller 62, confirmation of an operation status and various function operations can be executed.

Figure 4:
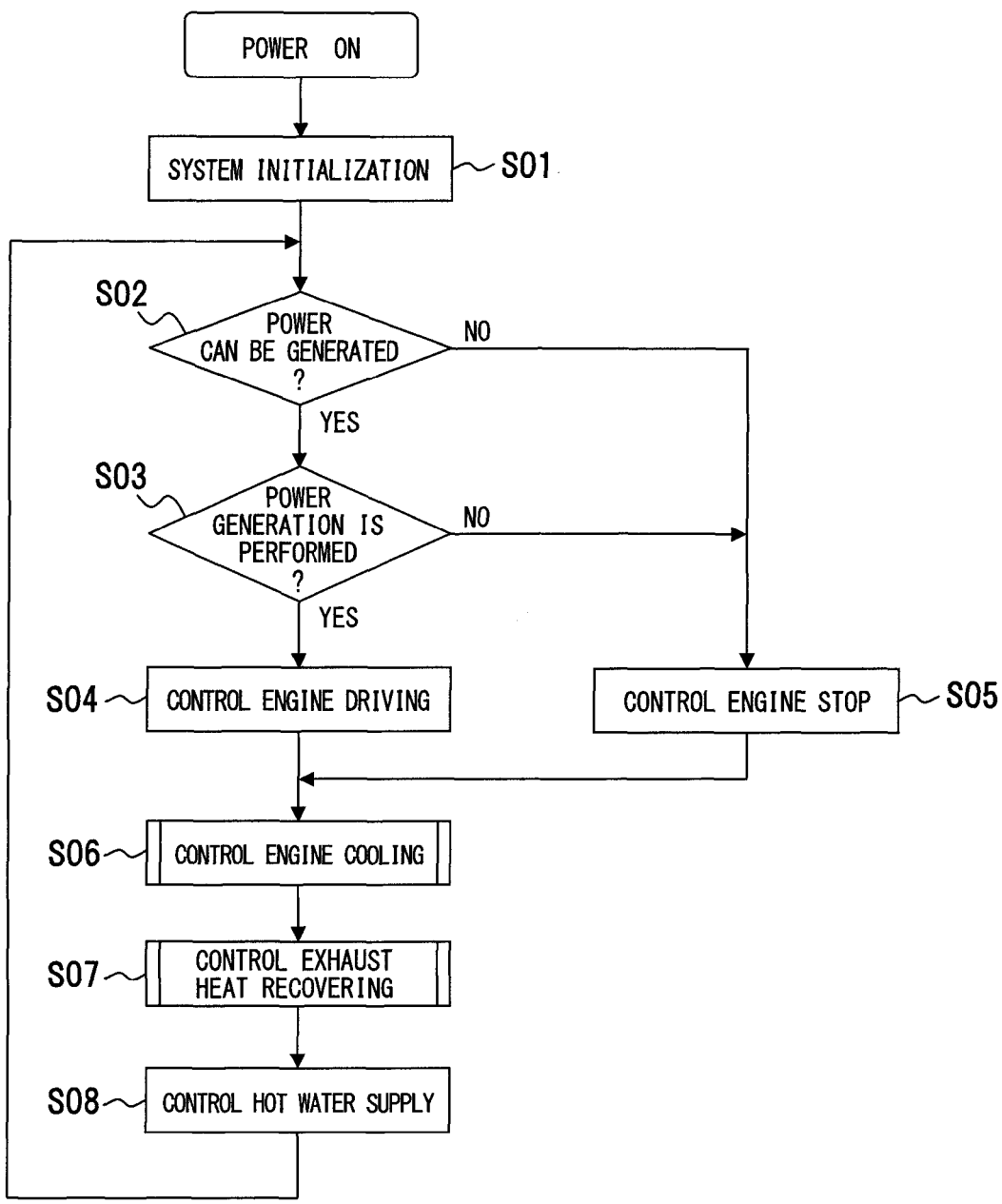
FIG. 4 is a flowchart showing processing procedure of main control.

Main control is described with reference to FIG. 4. FIG. 4 is a flowchart showing processing procedure of the main control. The structure shown in FIG. 4 is one example, and the present invention is not limited to such structure.

This processing procedure is one example of an exhaust heat recovering method or an exhaust heat recovering program that realizes the method. During booting of this system 2, the procedure is always executed, and composes a main routine. Each step of step S02 to step S08 is repeatedly executed during booting.

After power is on, a system initialization such as initializing of an input/output (I/O) unit of each of the controllers 30 and 62 and initialization of setting is executed (step S01). After this initialization, whether power can be generated or not is determined (step S02). This determination includes the determinations whether anomaly such as sensor anomaly occurs or not, and whether the heat storage tank 64 can store heat (there is a low temperature area in the heat medium 20 in the heat storage tank 64) or not. If power can be generated, power generation is performed (step S03). If the power generation is performed by a generation instruction on manual or for responding to expected power consumption, etc. (YES of step S03), driving control of the engine 24 is started (step S04), and the power generation is started.

When the power generation cannot be performed (NO of step S02) or the power generation is not performed (NO of step S03), stop control of the engine is performed (step S05) and the engine is stopped.

When the driving control of the engine (step S04) is performed, engine cooling control (step S06) is performed, and a process of cooling the engine 24 by the heat medium 18 and exhaust heat recovering control (step S07) are executed. In this exhaust heat recovering control, the heat generated by driving the engine 24 is exchanged by the medium of the heat media 18 and 20, and processes of recovering exhaust heat and storing the heat medium 20 in the heat storage tank 64, and hot water supply control (step S08) are executed. The hot water supply control is a process that when hot water supply is requested, heat is applied to the clean water W by the heat stored in the heat storage tank 64 to be supplied.

Each process of steps S06, S07 and S08 is basically independent. The order of the processes is not requested to obey this flowchart, and the processes may be executed at the same time.

Figure 5:
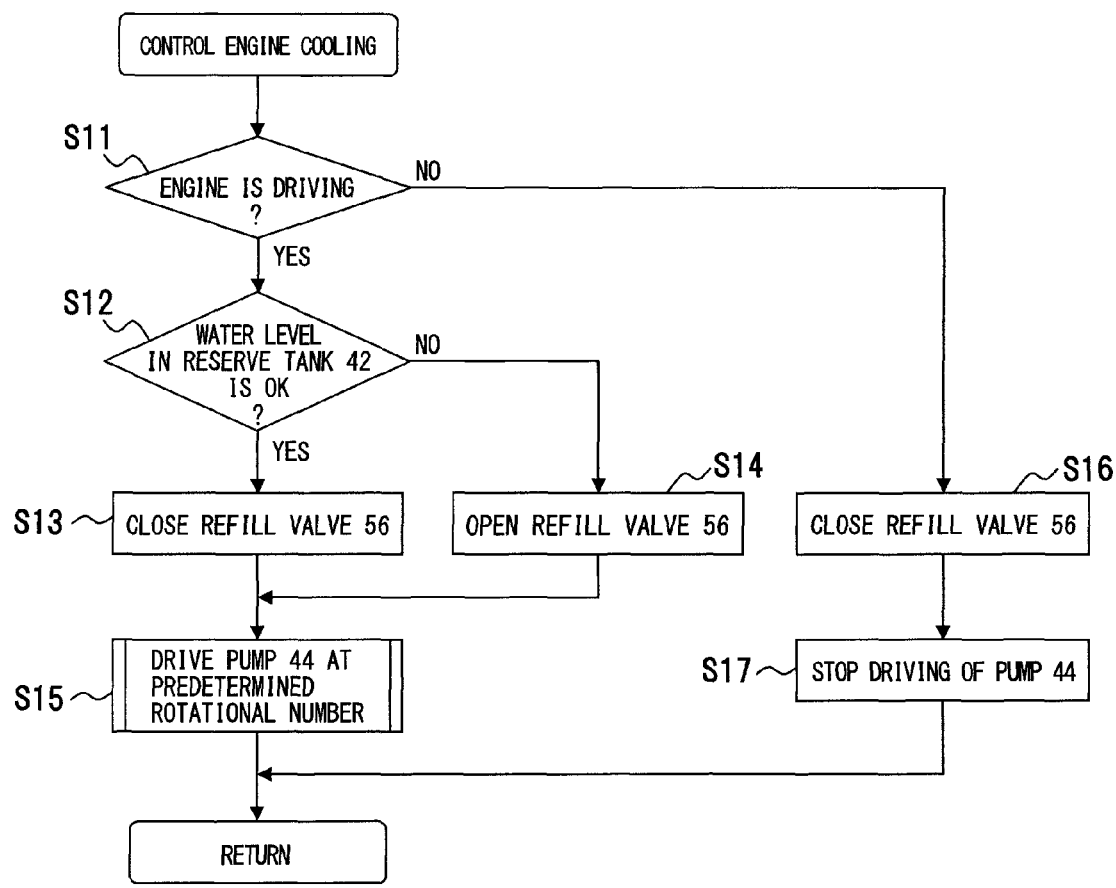
FIG. 5 is a flowchart showing processing procedure of cooling control of an engine.

Processing procedure of the engine cooling control is described with reference to FIG. 5. FIG. 5 is a flowchart showing the processing procedure of the engine cooling control. The structure shown in FIG. 5 is one example, and the present invention is not limited to such structure.

This process of the engine cooling control (step S06: FIG. 4) is one example of an exhaust heat recovering method or an exhaust heat recovering program. The process executes engine cooling by the circulation of the heat medium 18 accompanying the driving of the engine 24, and includes refill control when the heat medium 18 is reduced by vaporization, etc.

In this process of the engine cooling control, whether the engine 24 is during driving or not is determined (step S11). If the engine 24 is during driving (YES of step S11), the water level in the reserve tank 42 is confirmed (step S12). Unless the level of the heat medium 18 in the reserve tank 42 is down the L level (YES of step S12), the refill valve 56 is closed (step S13) and refilling is stopped. If the level of the heat medium 18 is down the L level (NO of step S12), the refill valve 56 is opened (step S14) and the heat medium 18 is refilled. Refilling of the heat medium 18 is executed by the heat medium 20 flowing through the exhaust heat recovering circuit 16. This refilling of the heat medium 20 starts when the water level electrode 58L is in an OFF state, and continues until the water level electrode 58H detects the heat medium 18. For this, the necessary volume of the heat medium 18 as a cooling medium necessary for cooling the engine 24 is maintained.

During driving of the engine 24, the pump 44 is maintained at a predetermined rotational number N (step S15), and the step returns to the main routine (step S06). This rotational number N of the pump 44 is determined such that although the heat medium 18 of the temperature at which the engine 24 can be driven efficiently, for example, 68 (° C.)-73 (° C.) is supplied for the heat exchange unit 46 of the engine 24 and heat is applied to the heat medium 18 by cooling the engine 24 down and by the surplus power heater 34, the heat medium flow rate (circulation rate) at which the heat medium 18 is not boiled is maintained. The heat medium flow rate obtained by the rotational number N may be a definite flow rate (definite circulation rate), for example, 3 (L/min). If this flow rate is high, temperature rising of the heat medium 18 can be suppressed. However, the more the rotational number is increased, the more power consumption of the pump 44 is increased. Thus, the flow rate may be restricted within the range of preventing the heat medium 18 from boil.

If the engine 24 is not driven (NO of step S11), the refill valve 56 is closed (step S16), driving of the pump 44 is stopped (step S17) and the step returns to the main routine (step S06).

Figure 6:
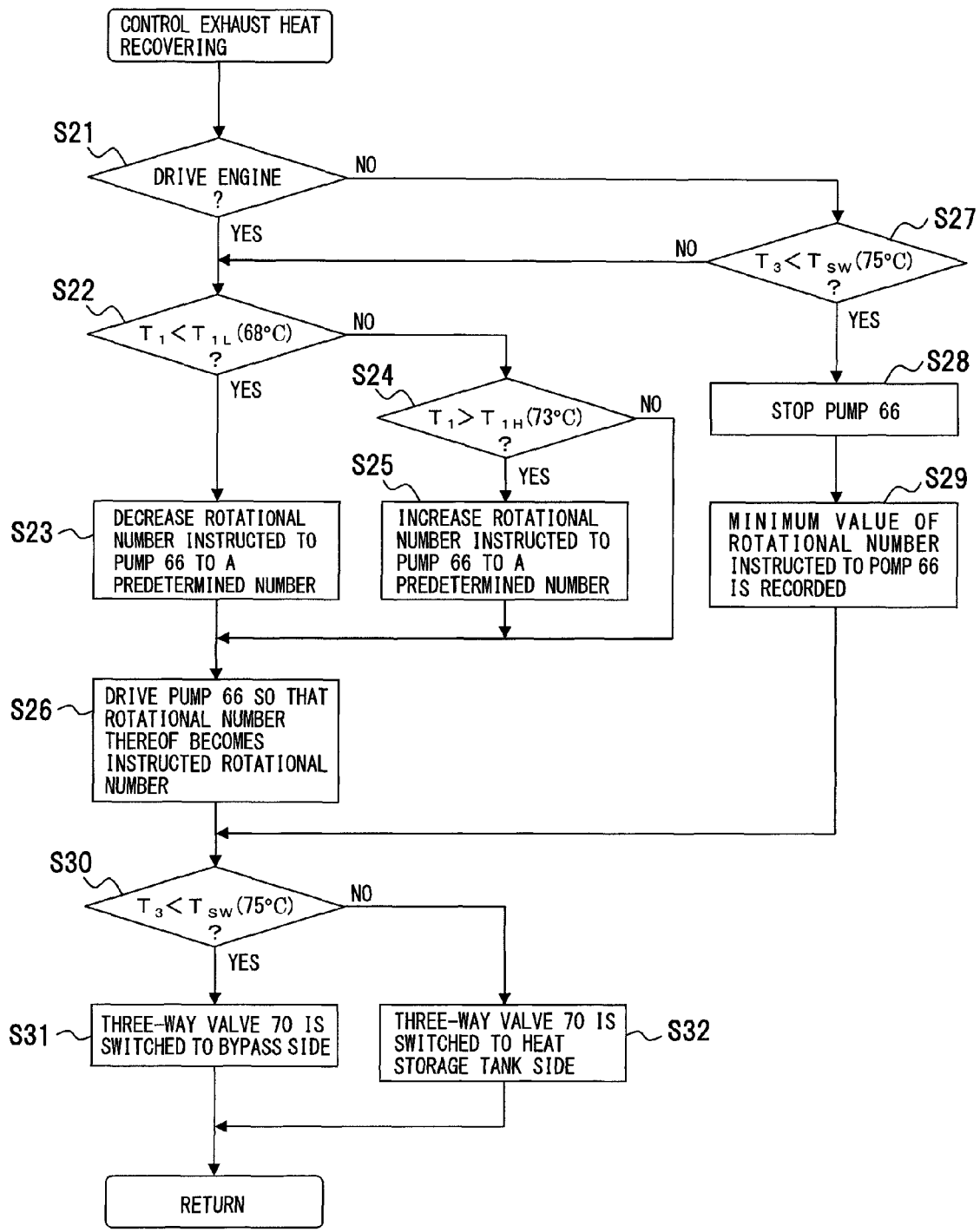
FIG. 6 is a flowchart showing processing procedure of exhaust heat recovering control.

Processing procedure of the exhaust heat recovering control (step S07: FIG. 4) is described with reference to FIG. 6. FIG. 6 is a flowchart showing the processing procedure of the exhaust heat recovering control. The structure shown in FIG. 6 is one example, and the present invention is not limited to such structure.

This process of the exhaust heat recovering control (step S07) is one example of an exhaust heat recovering method or an exhaust heat recovering program. The process controls the circulation rate of the heat medium 20, includes that the temperature of the heat medium 20 which recovered exhaust heat is monitored, and includes switching control of whether to store the heat by the heat medium 20 or to perform recovering the exhaust heat again.

In this exhaust heat recovering control process, whether the engine 24 is driven or not is determined (step S21). If the engine 24 is during driving (YES of step S21), the temperature of the heat medium 18 the heat of which is exchanged at the heat exchanger 52 is detected by the temperature sensor 48, the rotational number of the pump 66 is adjusted according to the detected temperature, and the flow rate (circulation rate) of the heat medium 20 is controlled.

In this case, if a detected temperature $T_1$ of the temperature sensor 48 is under a lower limited reference temperature $T_{1L}$, for example, 68 (° C.) (YES of step S22), the rotational number N of the pump 66 is more decreased than the current rotational number, that is, decrease of the rotational number is performed (step S23). In this case, the down amount (decrease amount) of the rotational number N may be down incrementally by a predetermined rotational number, for example, 100 (rpm), or decreased continuously at a predetermined rate for the current rotational number N. For the rotational number instructed to the pump 66, the minimum rotational number $N_{min}$ is set as the rotational number for maintaining the minimum flow rate (flow rate not generating partial boil in the heat exchanger 52). Maintaining the rotational number equal to or over such minimum rotational number $N_{min}$ prevents boil of the heat medium 18 to maintain reliable operations.

If the detected temperature $T_1$ of the temperature sensor 48 is equal to or over an upper limited reference temperature $T_{1H}$, for example, 73 (° C.) (YES of step S24), the rotational number N of the pump 66 is increased more than the current rotational number (step S25). The up amount (increase amount) of the rotation number N may be up incrementally by a predetermined rotation number, for example, 100 (rpm), or increased continuously at a predetermined rate for the current rotational number N as well as the down amount. In this case, the upper limit is predetermined by a pump ability, and the rotational number N may not be over the upper limit. The pump 66 is driven at the instructed rotational number (step S26), and the heat medium 20 is circulated.

When the engine 24 is not in a driving state (NO of step S21), if a detected temperature $T_3$ of the temperature sensor 68 is equal to or over a switch temperature $T_{SW}$ that is the reference temperature, for example, 75 (° C.) (NO of step S27), the step returns to step S22 and continues the exhaust heat recovering state since remaining heat of the heat medium 20 is left.

In this case, if the detected temperature $T_3$ of the temperature sensor 68 is under the switch temperature $T_{SW}$, for example, 75 (° C.) (YES of step S27), the pump 66 is stopped (step S28), and the exhaust heat recovering is stopped. In this case, for start of the next exhaust heat recovering, the rotational number, as a lower limit for securing the minimum flow rate, for indicating the rotational number of the pump is recorded to memory means of the generation unit controller 30 (step S29), and the rotational number is set as the rotational number of the next exhaust heat recovering.

The temperature of the heat medium 20 to which heat is applied through such exhaust heat recovering process is detected, and it is determined whether the detected temperature $T_3$ of the temperature sensor 68 is under the switch temperature $T_{SW}$ (step S30). If the detected temperature $T_3$ of the temperature sensor 68 is under the switch temperature $T_{SW}$, for example, 75 (° C.) (YES of step S30), the three-way valve 70 is switched to the port A-B side (a flow path is set at the bypass 72) (step S31), the heat medium 20 is circulated from the bypass 72 into the heat exchangers 36 and 52, and the step returns to the main routine (step S07) for executing the exhaust heat recovering again.

If the detected temperature $T_3$ of the temperature sensor 68 is equal to or over the switch temperature $T_{SW}$, for example, 75 (° C.) (NO of step S30), the three-way valve 70 is switched to the port A-C side (a flow path is set at the heat storage tank 64) (step S32), the heat medium 20 is introduced from the top of the tank to the heat storage tank 64, heat storage is performed, and the step returns to the main routine (step S07) to continue the exhaust heat recovering.

In this embodiment, since the lower limit reference temperature $T_{1L}$, and the upper limit reference temperature $T_{1H}$ are set for the detected temperature $T_1$ of the temperature sensor 48, and rotation control of the pump 66 is performed, a frequent change of the rotation of the pump 66, so-called, chattering can be prevented and stabilization of the control can be facilitated.

Figure 7:
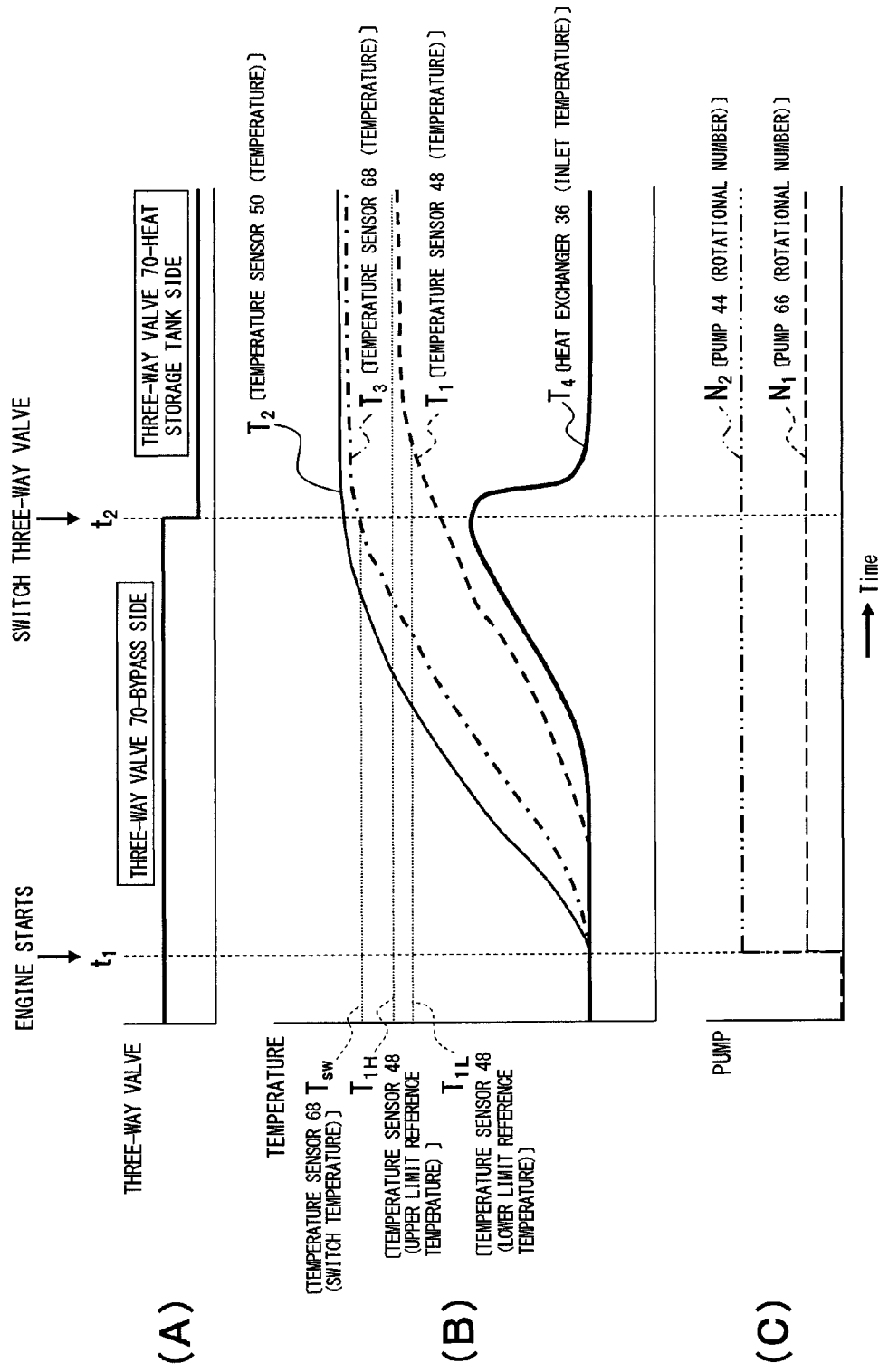
FIG. 7 depicts operational characteristics in booting.
Figure 8:
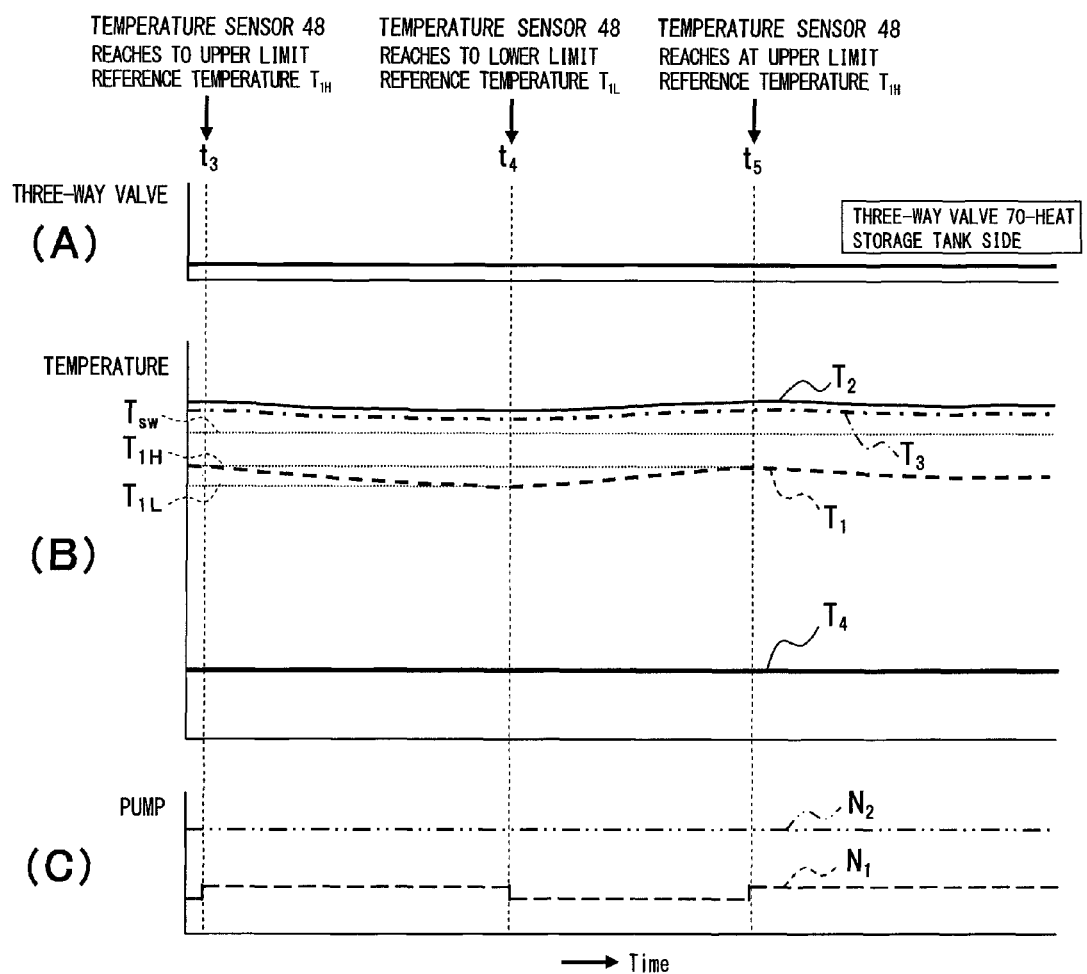
FIG. 8 depicts operational characteristics in being stable.
Figure 9:
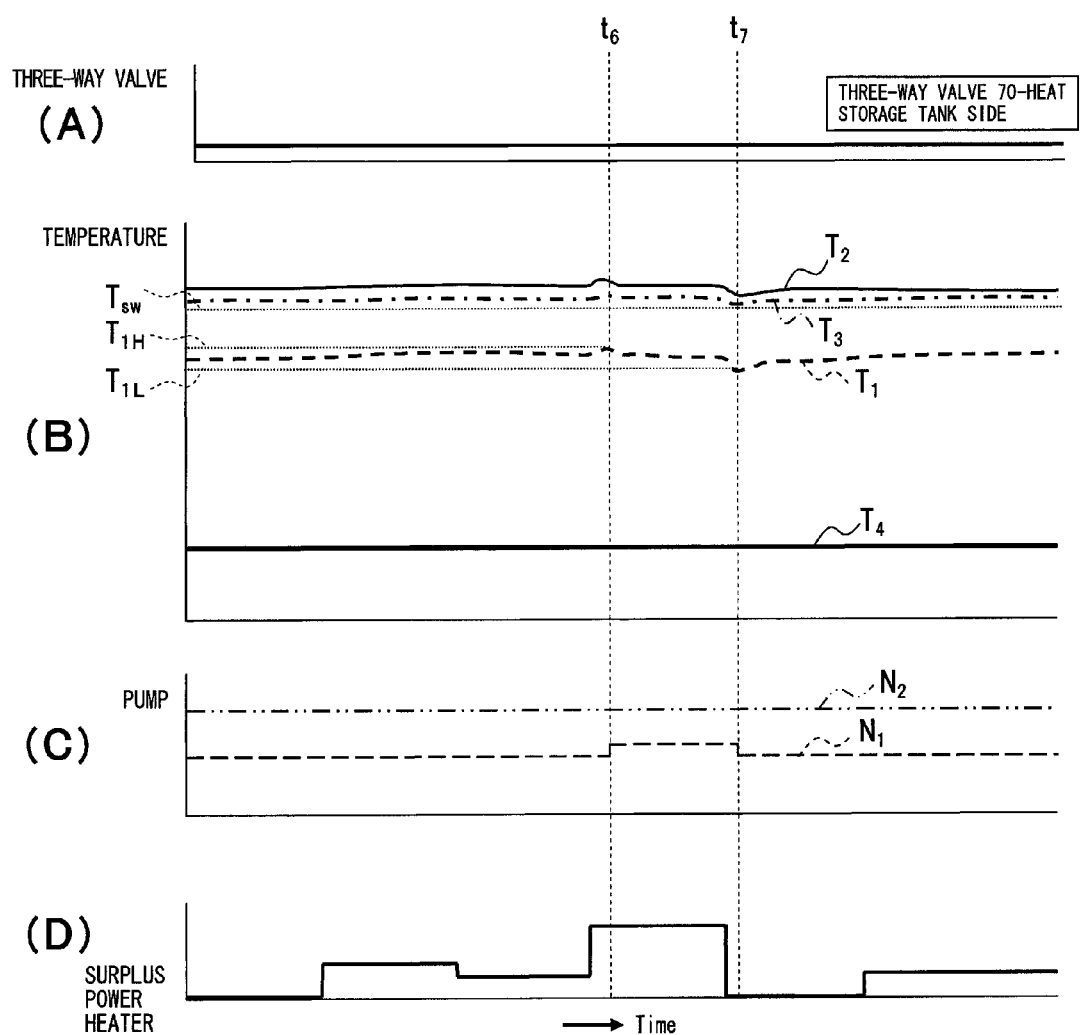
FIG. 9 depicts operational characteristics when surplus power is generated.
Figure 10:
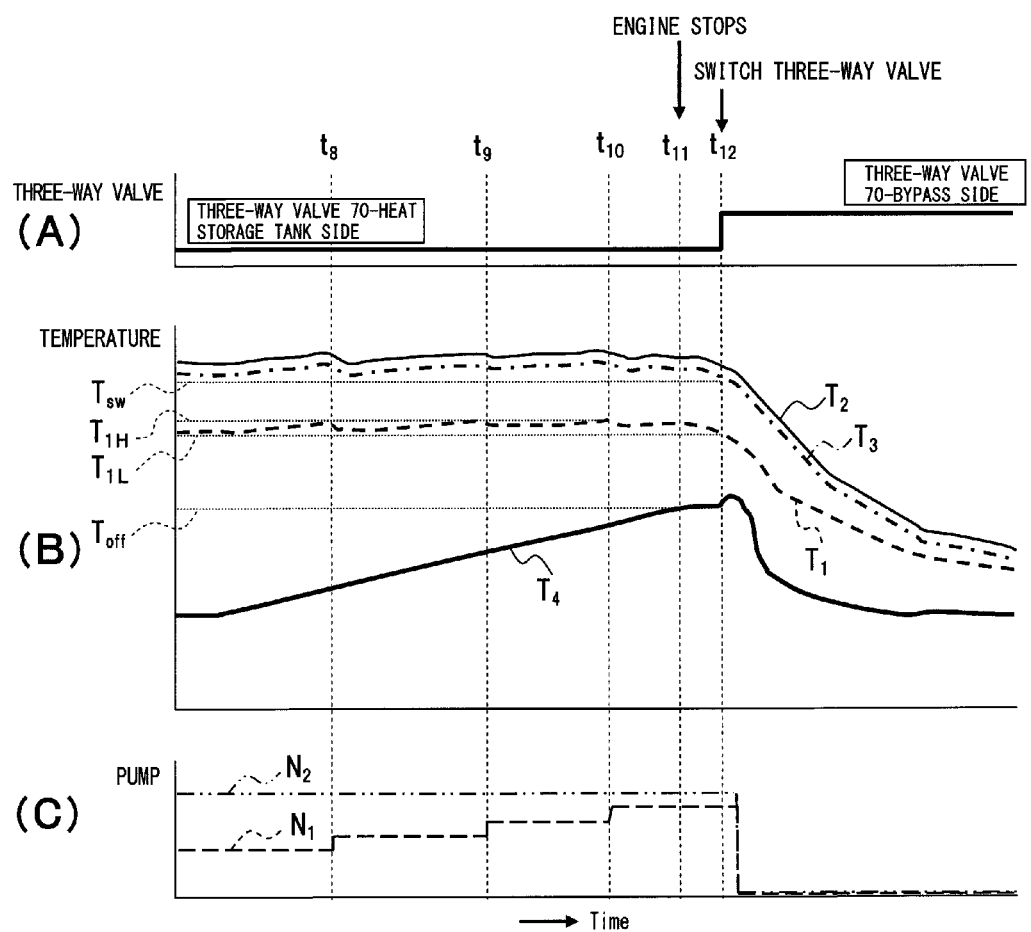
FIG. 10 depicts operational characteristics of a heat storage tank in being boiled.

The operation of the generation unit is described with reference to FIGS. 7, 8, 9 and 10. FIG. 7 depicts an operation when the generation unit is booted, FIG. 8 depicts an operation when the generation unit is driven (stable), FIG. 9 depicts an operation of a surplus power heater, and FIG. 10 depicts an operation when the heat storage tank is boiled. The operations shown in FIGS. 7, 8, 9 and 10 are one example, and the present invention is not limited to such operations and characteristics.

In FIGS. 7, 8, 9 and 10, (A) shows a switch operation of the three-way valve 70 and a circulation path of the heat medium 20, (B) shows transition of the detected temperatures $T_1$, $T_2$ and $T_3$ of the temperature sensors 48, 50 and 68, and an inlet temperature $T_4$ of the heat exchanger 36, (C) shows transition of a rotational number $N_1$ of the pump 66 and a rotational number $N_2$ of the pump 44, and (D) shows transition of surplus power outputs for the surplus power heater 34. In each Fig., $t_1$ is an engine start time point, $t_2$ is a switch time point of the three-way valve 70, $t_3$, $t_5$, $t_6$, $t_8$, $t_9$ and $t_{10}$ are time points when the detected temperature $T_1$ of the temperature sensor 48 reaches the upper limit reference temperature $T_{1H}$, and $t_4$ and $t_7$ are time points when the detected temperature $T_1$ thereof reaches the lower limit reference temperature $T_{1L}$, and switch time points of the rotational number of the pump 66. $t_{11}$ is a stop time point of the engine 24, and $t_{12}$ is a switch time point of the three-way valve 70.

For a predetermined time since the engine starts ($t_1$), the three-way valve 70 forms a flow path at the bypass 72 side. At the time point when the detected temperature $T_3$ of the temperature sensor 68 reaches the switch temperature $T_{SW}$ ($t_2$), the three-way valve 70 is switched to the heat storage tank 64 side. Thereby, the bypass 72 is closed, and the heat medium 20 of high temperature is stored in the heat storing tank 64.

In the transition period from the time point $t_1$ to the time point $t_2$, each of the detected temperatures $T_1$, $T_2$ and $T_3$ and the inlet temperature $T_4$ of the heat exchanger 36 rise according to the rotation of the engine 24.

Just after the time point $t_2$, the inlet temperature $T_4$ of the heat exchanger 36 suddenly drops to move to a stable state. This results from introducing the heat medium 20 of low temperature from the heat storage tank 64 to the exhaust heat recovering circuit 16 while the heat medium 20 circulates in the bypass 72 to raise its temperature. From this time point, a driving status moves to the heat recovering mode via a temperature rising during the transition period.

After passing through such transition period, the driving status moves to the stable state. As shown in FIG. 8, in the stable state, there is no big change in each of the detected temperatures $T_1$, $T_2$ and $T_3$ and the inlet temperature $T_4$. The three-way valve 70 is switched to the heat storing tank 64 side, and storage of the heat medium 20 continues in a successive and stable state. On the contrary, the rotational number $N_1$ of the pump 66 is slightly changed according to the transition of the detected temperature $T_1$ of the temperature sensor 48. This change shows control for executing stable heat recovering for the engine 24.

A generation output of the dynamo 26 is used on demand in households. If surplus power is generated, the surplus power heater 34 is driven by the surplus power, and heat is applied to the heat medium 18 by the generated heat of the surplus power heater 34. (D) of FIG. 9 shows a power output status for the surplus power heater 34.

When all the heat medium 20 in the heat storage tank 64 reach the upper limit temperature, this time point means that the heat medium 20 in the heat storage tank 64 is boiling. It is as described above that the engine 24 is stopped since more exhaust heat recovering is waste. In this case, at the time point when the inlet temperature $T_4$ of the heat exchanger 36 reaches an engine stop temperature $T_{off}$, $t_{11}$, engine stop is performed. Following to this engine stop, the three-way valve 70 is switched to the bypass 72 side at the time point $t_{12}$, the heat medium 20 is circulated in the bypass 72, supply thereof to the heat storage tank 64 is stopped, and all heat recovering is completed. By such completing operation, the detected temperatures $T_1$, $T_2$ and $T_3$ and the inlet temperature $T_4$ become a drop state.

Figure 11A:
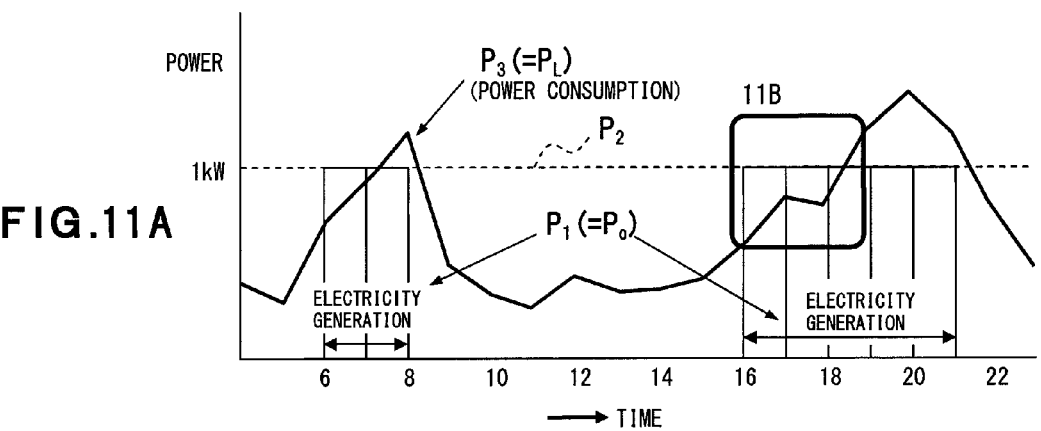
FIGS. 11A-11B depict generation of the surplus power.
Figure 11B:
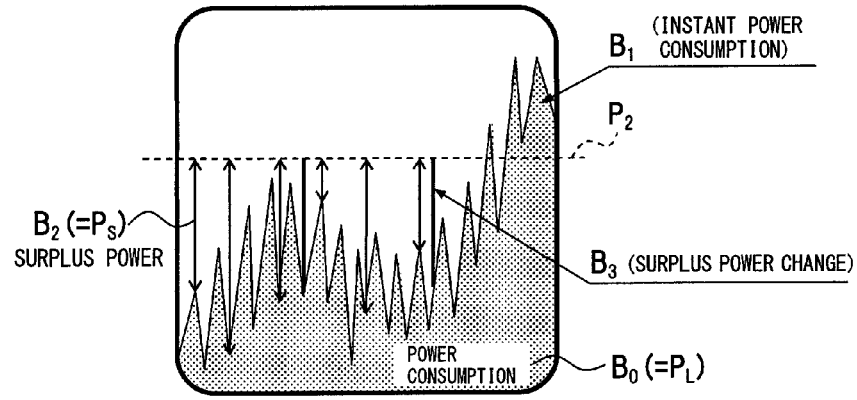

A process of surplus power is described with reference to FIGS. 11A-B. FIG. 11A depicts transition of a generation output and an electricity use state, and FIG. 11B is an enlarged view of apart of 11B of FIG. 11A. The generation output and the electricity use state shown in FIGS. 11A-11B are one example, and the present invention is not limited to such state.

In FIG. 11A, $P_1$ is a power generation capacity, $P_2$ is a certain power generation capacity (1 kW) line, and $P_3$ is a power consumption. FIG. 11B is transition of surplus power, wherein $B_0$ is a power consumption, $B_1$ is instant power consumption, $B_2$ is surplus power, and $B_3$ is a surplus power change.

The power generation capacity $P_1$ shown here corresponds to the above described generated power $P_O$ (FIG. 1). The power consumption $P_3$ and $B_0$ correspond to, for example, the above described power consumption $P_L$ of the household electricity as the load 32 (FIG. 1). The surplus power $B_2$ corresponds to the above described surplus power $P_S$ (FIG. 1).

The surplus power heater 34 generates heat in response to surplus power. The generated heat is applied to the heat medium 18 of the engine cooling circuit 14 after passing through the engine 24. By rotation of the engine 24, electricity generation is executed in the dynamo 26. The generated electricity is supplied to households after frequency and voltage are adjusted by the power conditioner (inverter) (after the electricity is inverted). It is difficult to execute the same amount of electricity generation correspondingly to the power consumption in households. However, an efficient power generation capacity is determined by a standard of the engine 24, etc.

When the power consumption in households is equal to or over a rated power generation capacity of the engine 24 (in the system 2, 1 kW), the engine 24 is driven to generate electricity. As shown in FIG. 11A, electricity generation is performed at six to eight o'clock and at sixteen to twenty-one o'clock. When the engine 24 is driven to perform electricity generation, there occurs the situation that electricity generation therefrom is over the power consumption because all of the generated electricity is not consumed in households. Difference therebetween becomes surplus power. This surplus power is difference power between the generated power and the consumed power. Means for converting this surplus power to heat is the surplus power heater 34. The maximum heat generation of the surplus power heater 34 occurs, for example, when the rated generation electricity 1 (kW). In this case, temperature management is needed so that partial boil of the heat medium 18 to which heat is applied does not occur. Therefore, the flow rate (circulation rate) of the heat medium 18 to which heat is applied is raised to control temperature raising, and the temperature of the heat medium 18 is dropped so as not to reach the boil temperature even if the temperature raising due to heat application by the surplus power occur. In this case, it is possible that the boil point of the heat medium 18 is raised.

In this system 2, the surplus power heater 34 is disposed in the engine cooling circuit 14. The heat medium 18 controlled within a range of 68 (° C.)-73 (° C.) in temperature with using the detected temperature $T_1$ of the temperature sensor 48 as control information raises its temperature to about 75 (° C.)-80 (° C.) after passing through the engine. Since the flow rate (circulation rate) of the heat medium 18 is, as described above, 3 (L/min), the temperature rising when the surplus power heater 34 maximally generates is assumed to be, for example, about 5 (° C.). If the rising of 5 (° C.), the maximum temperature is at most 85 (° C.), so it can be understood that the temperature is suppressed equal to or under the boil temperature of water.

From the above, the heat medium 18 is prevented from boiling, and the heat medium 18 to which heat is applied by the surplus power heater 34 exchange heat with the heat medium 20 in the heat exchanger 52. The temperature rising of the heat medium 18 to which heat is applied by the surplus power heater 34 and the engine cooling is suppressed by the circulation rate of the heat medium 20, and is maintained at the most efficient temperature. That is, the flow rate (circulation rate) of the heat medium 20 is controlled by using the detected temperature $T_1$ of the temperature sensor 48 as control information, thus, the heat exchange amount exchanged from the heat medium 18 to the heat medium 20 is adjusted.

According to the above described first embodiment, there are following effects and advantages.

(1) Exhaust heat can be efficiently recovered from a heat source generating exhaust air, and from the exhaust air, and the recovered heat can be stored with a heat medium.

(2) A heat medium for exhaust heat recovering can be supplied at low temperature, even latent heat of exhaust air can be recovered, and efficient exhaust heat recovering can be performed.

(3) Since the engine cooling circuit 14 and the exhaust heat recovering circuit 16 are separated, the engine 24 can be cooled down at efficient temperature.

(4) Since the engine cooling circuit 14 and the exhaust heat recovering circuit 16 are separated, the coolant volume (volume of the heat medium 18) used for engine cooling can be controlled or suppressed.

(5) Since a heat medium is returned to the heat storage tank 64 only when the temperature of the heat medium executing exhaust heat recovering is high, heat storage of high quality can be performed.

(6) Since the surplus power heater 34 changing surplus power to heat is disposed in the engine cooling circuit 14, energy due to heat generation thereof is stored in the engine cooling circuit 14 once. Since the heat medium flow rate of the engine cooling circuit 14 can be raised, boil of the heat medium 18 due to heat application by the surplus power heater 34 can also be prevented.

Second Embodiment

Figure 12:
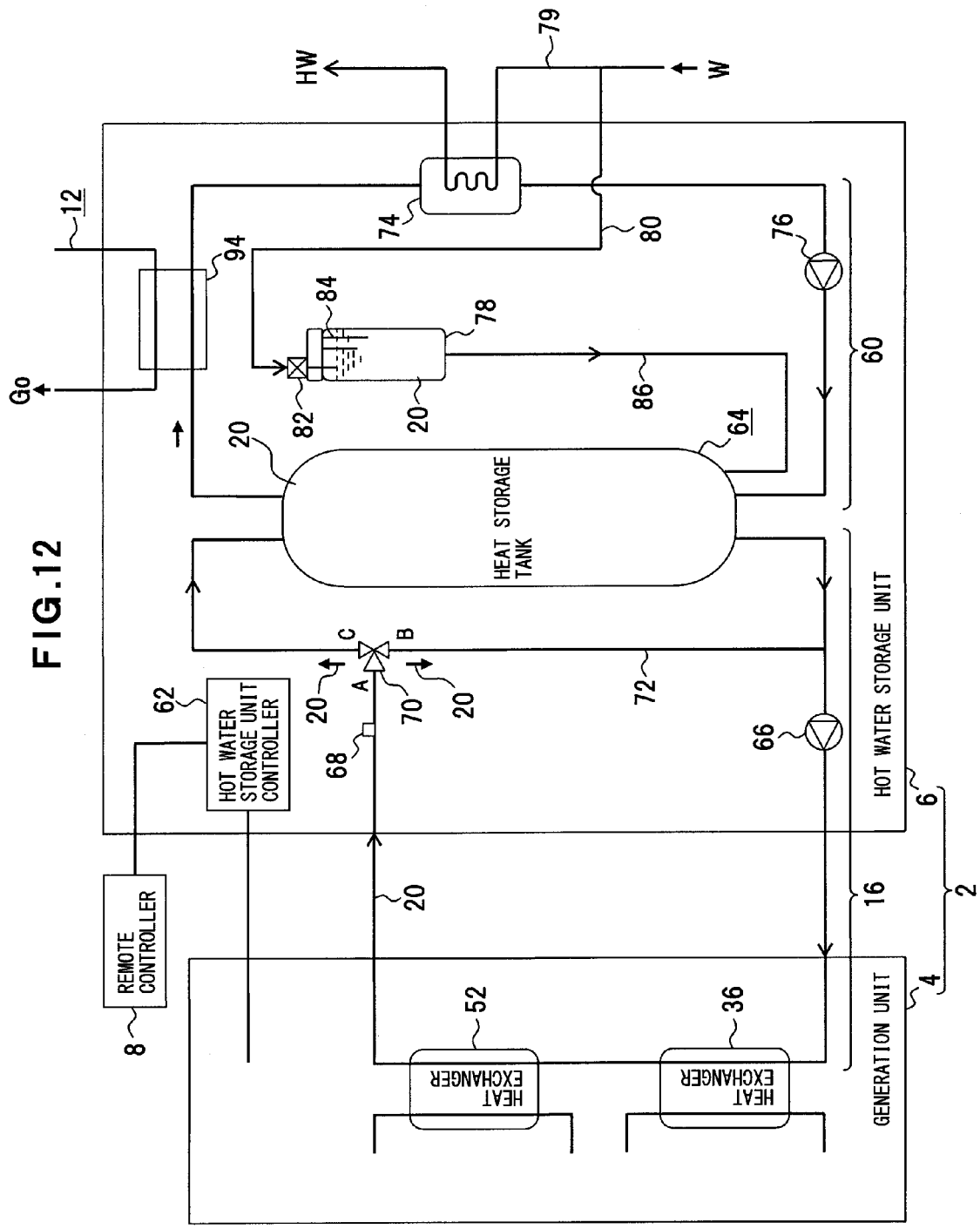
FIG. 12 depicts one example of a cogeneration system according to a second embodiment.

In this second embodiment, as shown in FIG. 12, a heat exchanger 94 is disposed in the hot water supply side heat exchange circuit 60, and this heat exchanger 94 may be configured to exchange the heat of the exhaust air 22 with the heat medium 20 at the hot water supply side. According to such structure, the temperature of hot water which flows out can be raised when the temperature of the heat medium 20 is low, or hot water supply is largely demanded.

Third Embodiment

Figure 13:
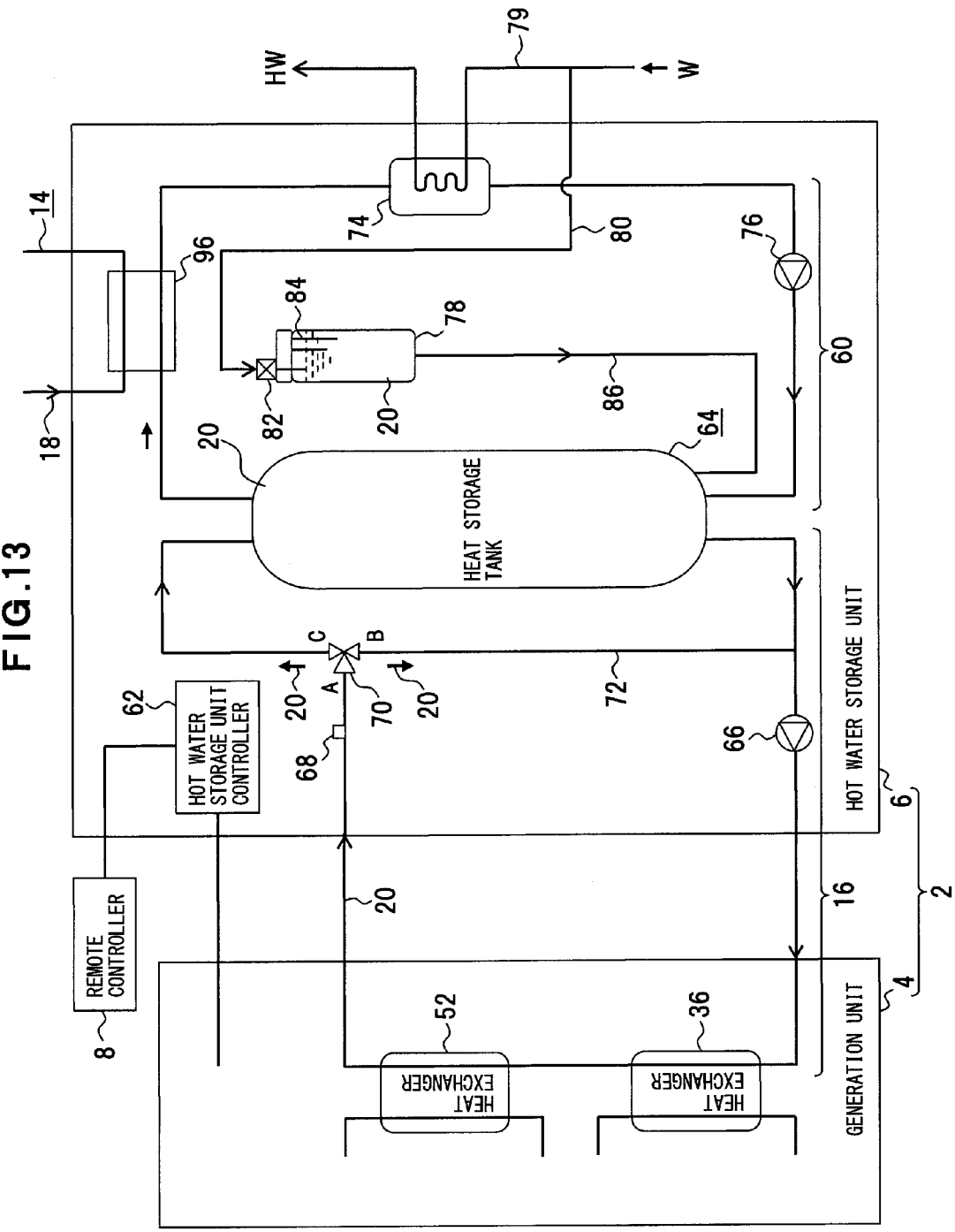
FIG. 13 depicts one example of a cogeneration system according to a third embodiment.

In this third embodiment, as shown in FIG. 13, a heat exchanger 96 is disposed in the hot water supply side heat exchange circuit 60, and this heat exchanger 96 may be configured to exchange the heat of the heat medium 18 with the heat medium 20 at the hot water supply side. According to such structure, the temperature of hot water which flows out can be raised when the temperature of the heat medium 20 is low, or hot water supply is largely demanded.

While the most preferred embodiments of the present invention have been described hereinabove, the present invention is not limited to the above embodiments, and it is a matter of course that various variations and modifications can be made by those skilled in the art within the scope of the claims and the specification without departing from the spirit of the invention disclosed herein, and needless to say, such variations and modifications are also encompassed in the scope of the present invention.

The present invention can recover the heat of a heat source generating exhaust air such as an engine, and of the exhaust air to store the heat. The heat stored in a heat medium is provided for hot water supply, etc. Therefore, an efficient operation state of the heat source is maintained and efficient use of exhaust heat can be facilitated, thus the present invention is useful.

What is claimed is:

1. An exhaust heat recovering apparatus that recovers heat from an engine that generates exhaust air, and from the exhaust air, the apparatus comprising:
   a first circulating path configured to cool the engine down by a first heat medium circulated in the engine;
   a second circulating path configured to circulate a second heat medium;

a heater that is disposed in the first circulating path, said heater configured to receive electricity, convert the electricity to heat, and apply the heat to the first heat medium;

a first heat exchanger configured to exchange heat from the exhaust air with the second heat medium that circulates in the second circulating path;

a second heat exchanger configured to exchange heat from the first heat medium with the second heat medium that circulates in the second circulating path;

a tank configured to store heat of the second heat medium to which heat is applied by the first heat exchanger and/or the second heat exchanger;

a temperature sensor that is disposed in the first circulating path, said temperature sensor configured to detect a temperature of the first heat medium after the heat from the first heat medium is exchanged by the second heat exchanger;

a pump that is disposed in the second circulating path; and a controller configured to drive the pump according to the temperature of the first heat medium after the heat from the first heat medium, which is detected by the temperature sensor, is exchanged to circulate the second heat medium in the second circulation path, and controls a circulation rate of the second heat medium so as to make the temperature of the first heat medium after the heat from the first heat medium is exchanged, a predetermined temperature.

2. The exhaust heat recovering apparatus of claim 1, wherein the second heat medium is liquid, and heat is applied to the second heat medium taken out from a lower layer of the tank by the first heat exchanger and the second heat exchanger to return the second heat medium to an upper layer of the tank.

3. The exhaust heat recovering apparatus of claim 1, further comprising:

a second temperature sensor configured to detect a temperature of the second heat medium;

a bypass that bypasses the tank, which stores the second heat medium, to make the second heat medium flow in the second circulation path; and a flow path switch configured to switch a flow path in which the second heat medium flows to the bypass side and/or the tank side, wherein if a detected temperature of the second temperature sensor is equal to or over a reference temperature, the second heat medium is returned to the tank, and if the detected temperature thereof is under the reference temperature, the second heat medium is circulated in the bypass side.

4. The exhaust heat recovering apparatus of claim 1, further comprising:

a dynamo that is driven by the engine, wherein the electricity is supplied by the dynamo.

5. A cogeneration system that includes an exhaust heat recovering apparatus configured to recover heat from an engine that generates exhaust air, and from the exhaust air, the system comprising:

a first circulating path configured to cool the engine down by a first heat medium circulated in the engine;

a second circulating path configured to circulate a second heat medium;

a heater that is disposed in the first circulating path, said heater configured to receive electricity, convert the electricity to heat, and apply the heat to the first heat medium;

a first heat exchanger configured to exchange heat from the exhaust air with the second heat medium that circulates in the second circulating path;

a second heat exchanger configured to exchange heat from the first heat medium with the second heat medium that circulates in the second circulating path;

a tank configured to store heat of the second heat medium to which heat is applied by the first heat exchanger and/or the second heat exchanger;

a temperature sensor that is disposed in the first circulating path, said temperature sensor configured to detect a temperature of the first heat medium after the heat from the first heat medium is exchanged by the second heat exchanger;

a pump that is disposed in the second circulating path; and a controller configured to drive the pump according to the temperature of the first heat medium after the heat from the first heat medium, which is detected by the temperature sensor, is exchanged to circulate the second heat medium in the second circulation path, and controls a circulation rate of the second heat medium so as to make the temperature of the first heat medium after the heat from the first heat medium is exchanged, a predetermined temperature.

6. The cogeneration system of claim 5, wherein the second heat medium is liquid, and heat is applied to the second heat medium taken out from a lower layer of the tank by the first heat exchanger and the second heat exchanger to return the second heat medium to an upper layer of the tank.

7. The cogeneration system of claim 5, further comprising:

a second temperature sensor configured to detect a temperature of the second heat medium;

a bypass that bypasses the tank, which stores the second heat medium, to make the second heat medium flow in the second circulation path; and a flow path switch configured to switch a flow path in which the second heat medium flows to the bypass side and/or the tank side, wherein if a detected temperature of the second temperature sensor is equal to or over a reference temperature, the second heat medium is returned to the tank, and if the detected temperature thereof is under the reference temperature, the second heat medium is circulated in the bypass side.

8. The cogeneration system of claim 5, further comprising:

a dynamo that is driven by the engine, wherein the electricity is supplied by the dynamo.

9. An exhaust heat recovering method that recovers recovering heat from an engine that generates exhaust air, and from the exhaust air, the method comprising:

cooling the engine down by a first heat medium that circulates in a first circulating path through the engine;

circulating a second heat medium in a second circulating path;

receiving, by a heater that is disposed in the first circulating path, electricity, converting the electricity to heat, and applying the heat to the first heat medium; exchanging heat from the exhaust air with the second heat medium that circulates in the second circulating path during a first heat exchange step;

exchanging heat from the first heat medium with the second heat medium that circulates in the second circulating path during a second heat exchange step;

detecting a temperature of the first heat medium after the exchanging heat from the first heat medium with the second heat medium; and storing heat of the second heat medium to which heat is applied by the first and/or the second heat exchange step, wherein the second heat medium is circulated in the second circulation path according to the temperature of the first heat medium after the exchanging heat from the first heat medium, and a circulation rate of the second heat medium is controlled so as to make the temperature of the first heat medium after the exchanging heat from the first heat medium, a predetermined temperature.

* * * * *